(12) United States Patent
Tobari et al.

(10) Patent No.: US 11,437,944 B2
(45) Date of Patent: Sep. 6, 2022

(54) POWER CONVERSION DEVICE

(71) Applicant: Hitachi Industrial Equipment Systems Co., Ltd., Tokyo (JP)

(72) Inventors: Kazuaki Tobari, Tokyo (JP); Yoshitaka Iwaji, Tokyo (JP); Agnes Hadinata, Tokyo (JP); Yusaku Onuma, Tokyo (JP); Takuya Sugimoto, Tokyo (JP); Atsuhiko Nakamura, Tokyo (JP); Hiroshi Watanabe, Tokyo (JP); Yoshiyuki Taguchi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 107 days.

(21) Appl. No.: 17/254,686

(22) PCT Filed: May 29, 2019

(86) PCT No.: PCT/JP2019/021187
§ 371 (c)(1),
(2) Date: Dec. 21, 2020

(87) PCT Pub. No.: WO2020/105204
PCT Pub. Date: May 28, 2020

(65) Prior Publication Data
US 2021/0273591 A1    Sep. 2, 2021

(30) Foreign Application Priority Data
Nov. 20, 2018    (JP) .............................. JP2018-217445

(51) Int. Cl.
*H02P 21/18*    (2016.01)
*H02P 21/16*    (2016.01)
(Continued)

(52) U.S. Cl.
CPC .............. *H02P 21/18* (2016.02); *H02M 7/48* (2013.01); *H02P 21/16* (2016.02); *H02P 21/22* (2016.02); *H02P 21/24* (2016.02); *H02P 23/14* (2013.01)

(58) Field of Classification Search
CPC .......... H02P 21/22; H02P 21/24; H02P 21/16; H02P 21/18; H02P 23/14; H02M 7/48
See application file for complete search history.

(56) References Cited

U.S. PATENT DOCUMENTS

2007/0085508 A1    4/2007    Fujitsuna et al.
2010/0117586 A1    5/2010    Akiyama
(Continued)

FOREIGN PATENT DOCUMENTS

JP    11-332279 A    11/1999
JP    2005-130691 A    5/2005
(Continued)

OTHER PUBLICATIONS

International Search Report (PCT/ISA/210) issued in PCT Application No. PCT/JP2019/021187 dated Jul. 23, 2019 with English translation (three (3) pages).
(Continued)

*Primary Examiner* — Rina I Duda
(74) *Attorney, Agent, or Firm* — Crowell & Moring LLP

(57) ABSTRACT

A power conversion device includes a harmonic voltage generation unit that superimposes dc-axis and qc-axis harmonic voltages on dc-axis and qc-axis voltage commands in accordance with a switching signal; and an inductance estimation unit that estimates dc-axis inductance and qc-axis inductance on a basis of dc-axis and qc-axis harmonic currents, amplitude values of the harmonic voltages, and the switching signal.

15 Claims, 6 Drawing Sheets

(51) Int. Cl.
*H02P 21/22* (2016.01)
*H02P 21/24* (2016.01)
*H02M 7/48* (2007.01)
*H02P 23/14* (2006.01)

(56) References Cited

U.S. PATENT DOCUMENTS

| | | | | |
|---|---|---|---|---|
| 2011/0279071 | A1* | 11/2011 | Yamada | H02P 21/0089 318/400.02 |
| 2015/0198491 | A1* | 7/2015 | Diaz Reigosa | G01L 3/00 702/41 |
| 2016/0072416 | A1* | 3/2016 | Hirotani | H02P 6/10 318/400.2 |

FOREIGN PATENT DOCUMENTS

| | | | |
|---|---|---|---|
| JP | 2007-110837 A | 4/2007 |
| JP | 2008-92657 A | 4/2008 |
| JP | 2010-119227 A | 5/2010 |

OTHER PUBLICATIONS

Japanese-language Written Opinion (PCT/ISA/237) issued in PCT Application No. PCT/JP2019/021187 dated Jul. 23, 2019 (three (3) pages).

* cited by examiner

POWER CONVERSION DEVICE

TECHNICAL FIELD

The present invention relates to a power conversion device, and more particularly to a power conversion device for position sensorless control.

BACKGROUND ART

Control technology for a permanent magnet (PM) motor in which permanent magnets are disposed on a rotor is known. For PM motors, a harmonic superimposition method may be used for position sensorless control in a low speed range from a halting state to about 10% of a base speed.

PTL1 related to the harmonic superimposition method describes a method of superimposing a harmonic signal on a voltage command during operation and estimating inductance from an output value of normal dc-axis and qc-axis current control. This method realizes highly accurate and highly responsive torque control in vector control with an encoder. Further, PTL1 describes that the method can be applied to position sensorless control based on an extended induced voltage in a medium to high speed range.

CITATION LIST

Patent Literature

PTL1: JP 2008-92657 A

SUMMARY OF INVENTION

Technical Problem

PTL1 describes that the method can be applied to position sensorless control based on extended electromotive force in a medium to high speed range, but does not consider estimation of inductance during operation in a low speed range from a halting state to about 10% of a base speed.

An object of the present invention is to provide a power conversion device for position sensorless control that accurately estimates inductance during operation in a speed range including a low speed range.

Solution to Problem

A preferred example of the present invention is a power conversion device including a harmonic voltage generation unit that superimposes harmonic voltages of a dc-axis and qc-axis on voltage commands of the dc-axis and qc-axis in accordance with a switching signal; and an inductance estimation unit that estimates pieces of inductance of the dc-axis and qc-axis on a basis of dc-axis and qc-axis harmonic currents, amplitude values of the harmonic voltages, and the switching signal.

Advantageous Effects of Invention

According to the present invention, it is possible to realize a power conversion device for position sensorless control that accurately estimates inductance during operation in a speed range including a low speed range.

DESCRIPTION OF EMBODIMENTS

Embodiments will be described in detail below with reference to the drawings.

First Embodiment

Figure 1:
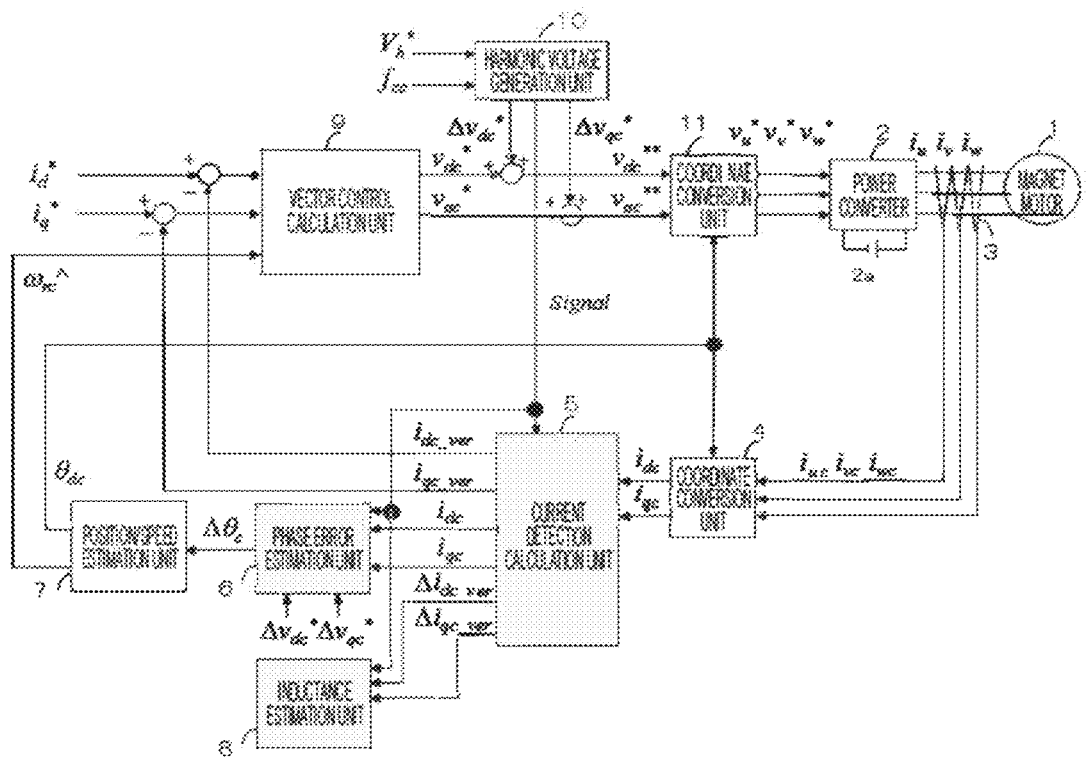
FIG. 1 is a configuration diagram of a system including a power conversion device and a magnet motor according to the first embodiment.

FIG. 1 is a configuration diagram of a system including a power conversion device and a magnet motor according to the first embodiment. The magnet motor 1 outputs motor torque obtained by combining a torque component caused by a magnetic flux of a permanent magnet and a torque component caused by inductance of an armature winding.

A power converter 2 includes a semiconductor element as a switching element. The power converter 2 receives three-phase AC voltage command values $v_u^*$, $v_v^*$, and $v_w^*$ and creates a gate signal (on, off) voltage proportional to the voltage command values $v_u^*$, $v_v^*$, and $v_w^*$. In a case where an IGBT, which is an example of a switching element, is used, the IGBT performs a switching operation based on a gate signal. Further, the power converter 2 outputs a DC voltage $E_{dc}$, which is output of a DC voltage source $2a$, and a voltage proportional to the three-phase AC voltage command values $v_u^*$, $v_v^*$, and $v_w^*$ to make an output voltage and a rotational speed of the magnet motor 1 variable.

A current detector 3 detects three-phase alternating currents $i_u$, $i_v$, and $i_w$ of the magnet motor 1. The current detector 3 may detect two of the three phases of the magnet motor 1, for example, u-phase and w-phase currents, and obtain a v-phase current as $i_v = -(i_u + i_w)$ from an AC condition ($i_u + i_v + i_w = 0$). Although an example in which the current detector 3 is provided in the power conversion device is illustrated in the present embodiment, the current detector 3 may be provided outside the power conversion device.

Next, constituent elements of a control unit that controls the power converter are described below. A coordinate conversion unit 4 outputs dc-axis and qc-axis current detection values $i_{dc}$ and $i_{qc}$ generated from current detection values $i_{uc}$, $i_{vc}$ and $i_{wc}$ of the three-phase AC currents $i_u$, $i_v$ and $i_w$ on the basis of a position estimation value $\theta_{dc}$.

A current detection calculation unit 5 outputs the dc-axis and qc-axis current detection values $i_{dc}$ and $i_{qc}$, harmonic current amplitude values $\Delta i_{dc\_ver}$ and $\Delta i_{qc\_ver}$, and average values $i_{dc\_ver}$ and $i_{qc\_ver}$.

A phase error estimation unit 6 outputs a phase error estimation value $\Delta\theta_c$ generated from the dc-axis and qc-axis current detection values $i_{dc}$ and $i_{qc}$.

A position/speed estimation unit 7 outputs a speed estimation value $\omega_{rc}{}^\wedge$ and a position estimation value $\theta_{dc}$ generated from the phase error estimation value $\Delta\theta_c$.

An inductance estimation unit 8 outputs inductance estimation values $L_d{}^\wedge$ and $L_q{}^\wedge$ generated from a dc-axis and qc-axis harmonic voltage amplitude value $\Delta v_h{}^*$ and the harmonic current amplitude values $\Delta i_{dc\_ver}$ and $\Delta i_{qc\_ver}$.

A vector control calculation unit 9 outputs dc-axis and qc-axis voltage commands $v_{dc}{}^*$ and $v_{qc}{}^*$ on the basis of a deviation between a dc-axis current command $i_d{}^*$ and the average value $i_{dc\_ver}$, a deviation between a qc-axis current command $i_q{}^*$ and the average value $i_{qc\_ver}$ an electric constant of the magnet motor 1, and the speed estimation value $\omega_{rc}{}^\wedge$.

A harmonic voltage generation unit 10 sets a harmonic voltage amplitude value $v_h{}^*$ and a harmonic frequency $f_{cc}$ and outputs a dc-axis harmonic voltage $\Delta v_{dc}{}^*$ and a qc-axis harmonic voltage $\Delta v_{qc}{}^*$.

A coordinate conversion unit 11 outputs, to the power converter, the three-phase AC voltage commands $v_u{}^*$, $v_v{}^*$, and $v_w{}^*$ generated from $v_{dc}{}^{}$ and $v_{qc}{}^{}$, which are sums of the voltage commands $v_{dc}{}^*$ and $v_{qc}{}^*$ and the harmonic voltages $\Delta v_{dc}{}^*$ and $\Delta v_{qc}{}^*$ on the basis of the position estimation value $\theta_{dc}$.

First, basic operation of voltage control based on vector control and phase control according to the present embodiment will be described. The vector control calculation unit 9 for voltage control calculates PI control output $\Delta v_{dc\_pi}$ of d-axis current control, I control output $\Delta v_{dc\_i}$ of d-axis current control, PI control output $\Delta v_{qc\_pi}$ of q-axis current control, and I control output $\Delta v_{qc\_i}$ of q-axis current control on the basis of a deviation between the d-axis current command $i_d{}^*$ and the average value $i_{dc\_ver}$ and a deviation between the q-axis current command $i_q{}^*$ and the average value $i_{qc\_ver}$.

Further, the vector control calculation unit 9 calculates dc-axis and qc-axis voltage commands $v_{dc}{}^*$ and $v_{qc}{}^*$ according to Equation (1) using the PI control output $\Delta v_{dc\_pi}$ of d-axis current control, the I control output $\Delta v_{dc\_i}$ of d-axis current control, the PI control output $\Delta v_{qc\_pi}$ of q-axis current control, the I control output $\Delta v_{qc\_i}$ of q-axis current control, which are output of dc-axis and qc-axis current control, the speed estimation value $\omega_{rc}{}^\wedge$, and the electric constants (R, $L_d$, $L_q$, $K_e$) of the magnet motor 1.

[Equation 1]

$$v_{dc}^* = -\hat{\omega}_{rc} \cdot \frac{L_q^*}{R^*} \cdot \Delta v_{qc\_i} + \Delta v_{dc\_pi}$$

$$v_{qc}^* = \hat{\omega}_{rc} \cdot \frac{L_d^*}{R^*} \cdot \Delta v_{dc\_i} + \hat{\omega}_{rc} \cdot K_e^* + \Delta v_{qc\_pi}$$

Equation (1)

The parameters are as follows:
R: overall resistance of the magnet motor
$L_d$: d-axis inductance, $L_q$: q-axis inductance
$K_e$: induced voltage coefficient *: Set value
$\Delta V_{dc\_pi}$: PI control output of d-axis current control, $\Delta v_{dc\_i}$: I control output of d-axis current control
$\Delta v_{qc\_pi}$: PI control output of q-axis current control, $\Delta v_{qc\_i}$: I control output of q-axis current control The harmonic voltage generation unit 10 outputs the harmonic voltages $\Delta v_{dc}{}^*$ and $\Delta v_{qc}$ of a square wave or a sine wave of the harmonic voltage amplitude value $v_h{}^*$ and frequency $f_{cc}$, and the harmonic voltages $\Delta v_{dc}{}^*$ and $\Delta v_{qc}{}^*$ are added to the voltage commands $v_{dc}{}^*$ and $V_{qc}{}^*$ as shown in Equation (2), to calculate $v_{dc}{}^{}$ and $v_{qc}{}^{}$, and the three-phase voltage commands $V_u{}^*$, $v_v{}^*$ and $V_w{}^*$ that control the power converter 2 are controlled.

[Equation 2]

$$v_{dc}^{**} = v_{dc}^* + \Delta v_{dc}^*$$
$$v_{qc}^{**} = v_{qc}^* + \Delta v_{qc}^*$$

Equation 2

As for the phase error estimation unit 6 for phase control, for example, "Initial Rotor Position Estimation of Interior Permanent Magnet Synchronous Motor", The transactions of the Institute of Electrical Engineers of Japan. D, A publication of Industry Applications Society, Vol. 123 (2003) No. 2 140-148 can be referred to. According to this method, the harmonic voltage generation unit 10 superimposes the harmonic voltage $\Delta v_{dc}{}^*$ and $\Delta v_{gc}{}^*$, of a square wave or a sine wave on the dc axis and the qc axis, and the phase error estimation unit 6 calculates a phase error estimation value $\Delta\theta_c$ according to Equation (3).

[Equation 3]

$$\Delta\theta_c = \frac{1}{2}\tan^{-1}\left[\frac{2\{(Ld + Lq)V_{vdc}^*V_{vqc}^* - Ld \cdot Lq(V_{vqc}^*V_{idc} + V_{vdc}^*V_{iqc})\}}{2 \cdot Ld \cdot Lq(V_{vdc}^*V_{idc} - V_{vqc}^*V_{iqc}) - (Ld + Lq)(V_{vdk}^{*2} - V_{vqc}^{*2})}\right]$$

Equation (3)

Definitions of the signs in Equation (3) are as follows: $L_d$: d-axis inductance value, $L_q$: q-axis inductance value, $Vv_{dc}{}^*$: harmonic voltage command superimposed on the dc axis, $Vv_{qc}{}^*$: harmonic voltage command superimposed on the qc axis, $V_{idc}$: harmonic current of the dc axis, $V_{iqc}$: harmonic current of the qc axis.

Further, the position/speed estimation unit 7 controls the speed estimation value $\omega_{rs}$ and the position estimation value $\theta_{dc}$ by the calculation shown in Equation (4) so that the phase error estimation value $\Delta\theta_c$ is set to "zero".

[Equation 4]

$$\hat{\omega}_{rc} = 0 - \Delta\theta_c \cdot \left(K_p + \frac{K_i}{s}\right) \qquad \text{Equation (4)}$$

$$\theta dc = \frac{1}{s} \cdot \hat{\omega}_{rc}$$

The parameters are as follows: $K_p$: proportional gain, $K_1$: integral gain, s: Laplace operator.

However, the above reference document mentions that Equation (3) is very complex and is greatly affected by fluctuations in motor constant. In view of this, in the above reference document, the phase error $\Delta\theta_c$ is calculated according to simple Equation (5) by superimposing the harmonic voltage on only one axis.

For example, when, $\Delta\theta_{qc*}=0$,

[Equation 5]

$$\Delta\theta_c = \frac{Ld \cdot Lq}{Ld - Lq} \cdot \frac{i_{qc} \cdot s}{\Delta v_{dc}^*} \qquad \text{Equation (5)}$$

According to Equation (5), inductance can be estimated from a relationship between the harmonic voltage and current in the axial direction in which the harmonic voltage is superimposed, but inductance in the axial direction in which the harmonic voltage is not superimposed cannot be estimated.

This problem is improved by using the harmonic voltage generation unit 10, the current detection calculation unit 5, the phase error estimation unit 6, and the inductance estimation unit 8, which are the features of the present embodiment.

The following describes control characteristics obtained in a case where these units are used.

Figure 2:
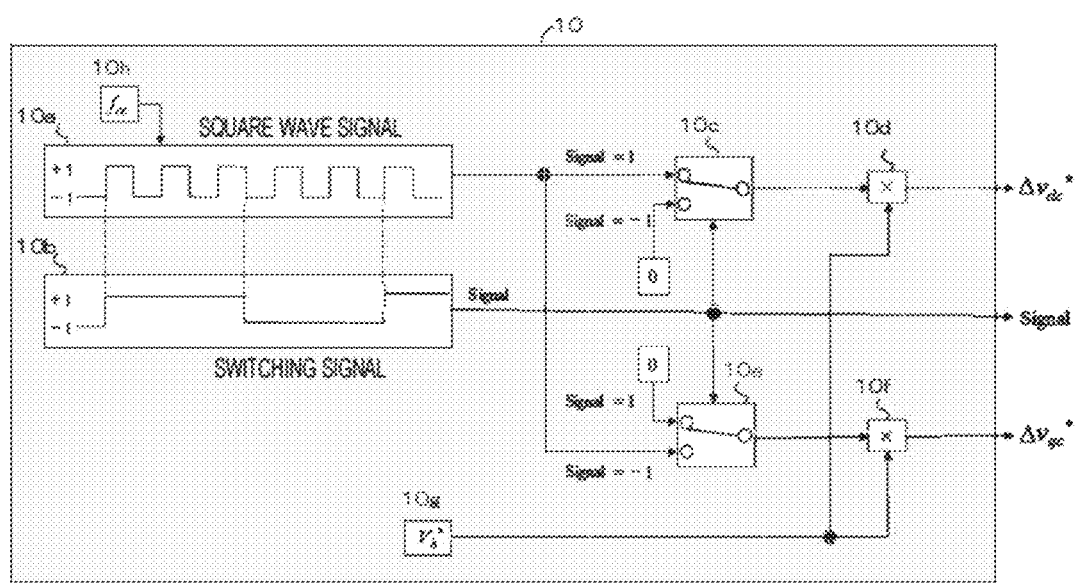
FIG. 2 illustrates a configuration of a harmonic voltage generation unit according to the first embodiment.

FIG. 2 illustrates a configuration of the harmonic voltage generation unit 10 according to the first embodiment. This configuration will be described below.

The reference sign "10a" represents a square wave signal related to a harmonic voltage. A magnitude thereof is ±1, and a harmonic frequency thereof is about several hundred Hz to several thousand Hz, which can be set to $f_{cc}$ (indicated by 10h) from an outside.

The reference sign "10b" represents a switching signal Signal that determines a direction in which the harmonic voltage is superimposed. A magnitude thereof is ±1, and a frequency thereof is about several times smaller to about several tens of times smaller than the square wave signal output from 10a.

The reference sign "10c" represents a harmonic voltage generation unit in the dc-axis direction. When Signal=1, an output signal of 10c is 10a. Then, a multiplication unit 10d calculates a dc-axis harmonic voltage $\Delta v_{dc}^*$ by multiplying a constant 10g, which is a harmonic voltage amplitude value $v_h^*$. The amplitude value $v_h^*$ can be set in 10g from the outside.

The reference sign "10e" represents a harmonic voltage generation unit in the qc-axis direction. When Signal=−1, an output signal of 10e is 10a. Then, a multiplication unit 10f calculate a qc-axis harmonic voltage $\Delta v_{dc}^*$ by multiplying the constant 10g, which is the harmonic voltage amplitude value $v_h^*$.

Figure 3:
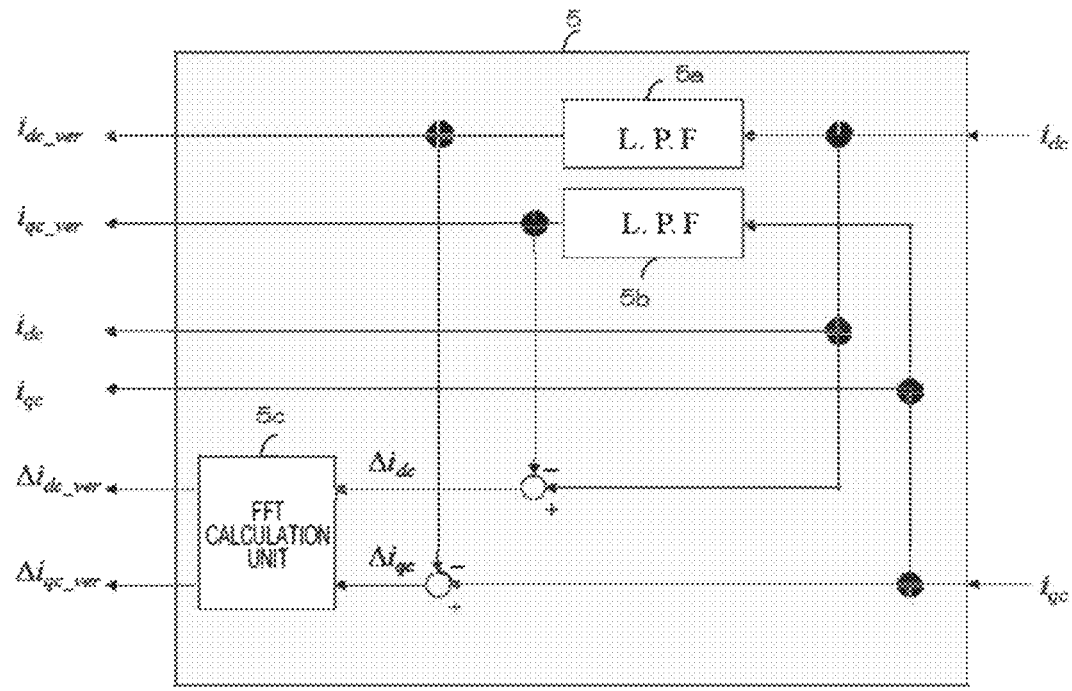
FIG. 3 illustrates a configuration of a current detection calculation unit according to the first embodiment.

FIG. 3 illustrates a configuration of the current detection calculation unit 5 according to the first embodiment. This configuration will be described below. Low pass filters (L.P.F) 5a and 5b output average values $i_{dc\_ver}$ and $i_{qc\_ver}$ of current detection values obtained by removing harmonic currents contained in the current detection values $i_{dc}$ and $i_{qc}$.

The L.P.F 5a and the L.P.F 5b may be, for example, moving average filters. Further, harmonic currents $\Delta i_{dc}$ and $\Delta i_{qc}$ are calculated according to Equation (6) using the current detection values $i_{dc}$ and $i_{qc}$ and the average values $i_{dc\_ver}$ and $i_{qc\_ver}$ of the current detection values.

[Equation 6]

$$\Delta i_{dc} = i_{dc} - i_{dc\_\text{ver}} \qquad \text{Equation (6)}$$
$$\Delta i_{qc} = i_{qc} - i_{qc\_\text{ver}}$$

A fast Fourier transform (FFT) calculation unit 5c outputs $\Delta i_{dc\_ver}$ and $\Delta_{qc\_ver}$ which are amplitude values of the harmonic currents $\Delta i_{dc}$ and $\Delta i_{qc}$.

Figure 4:
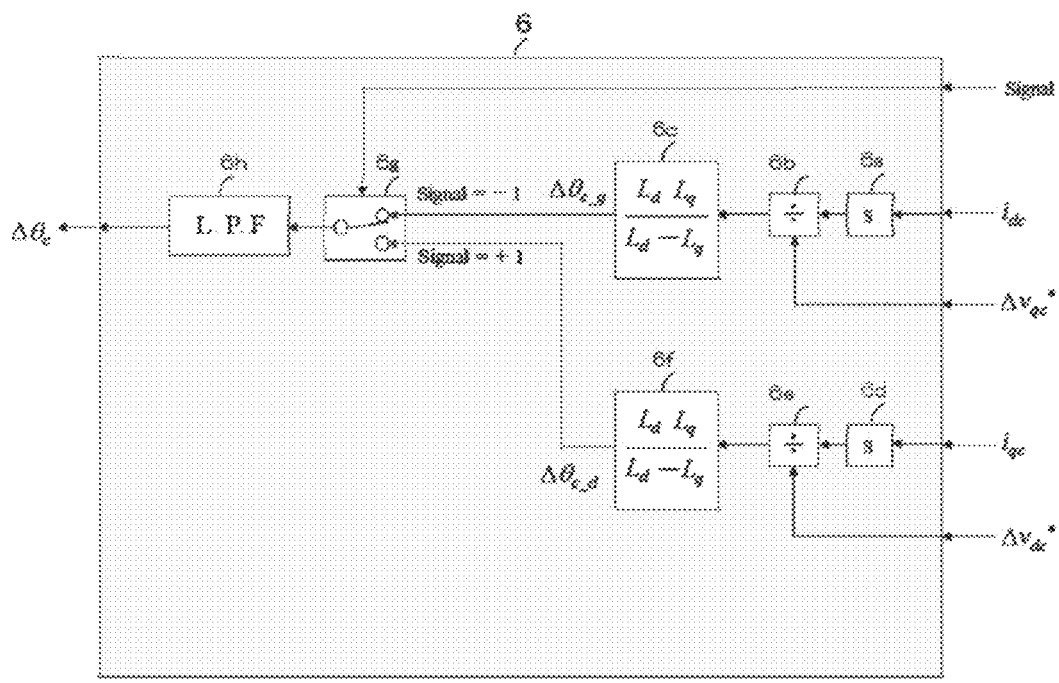
FIG. 4 illustrates a configuration of a phase error estimation unit according to the first embodiment.

FIG. 4 illustrates a configuration of the phase error estimation unit 6 according to the first embodiment. This configuration will be described below. The reference signs "6a" and "6d" represent differential calculation units, the reference signs "6b" and "6e" represent division calculation units, and the reference signs "6c" and "6f" represent proportional coefficients calculated from d-axis and q-axis inductance values. Phase error estimation values $\Delta\theta_{c\_d}$ and $\Delta\theta_{c\_q}$ are calculated according to Equations (7) and (8) using the current detection values $i_{dc}$ and $i_{qc}$, harmonic voltages $\Delta v_{dc}^*$ and $\Delta v_{qc}^*$, d-axis inductance value $L_d$, and q-axis inductance value $L_q$.

[Equation 7]

$$\Delta\theta_{c\_d} = \frac{Ld \cdot Lq}{Ld - Lq} \cdot \frac{i_{qc} \cdot s}{\Delta v_{dc}^*} \qquad \text{Equation (7)}$$

[Equation 8]

$$\Delta\theta_{c\_q} = \frac{Ld \cdot Lq}{Ld - Lq} \cdot \frac{i_{dc} \cdot s}{\Delta v_{qc}^*} \qquad \text{Equation (8)}$$

It is assumed that an axis based on a magnetic pole axis of the motor is a d-q axis, and an estimation coordinate axis used in the calculation unit and the estimation unit in the embodiment is a dc-qc axis. The phase error estimation value $\Delta\theta_c$ estimated by the phase error estimation unit is a phase error estimation value $\Delta\theta_{c\_d}$ between the d-axis and the dc-axis or a phase error estimation value $\Delta\theta_{c\_d}$ between the q-axis and the qc-axis.

An output signal of a switching unit 6g is a calculation value $\Delta\theta_{c\_d}$ when Signal=1 and is a calculation value $\Delta\theta_{c\_d}$ when Signal=−1. This output signal is input to an L.P.F 6h, which outputs $\Delta\theta_c$.

Figure 5:
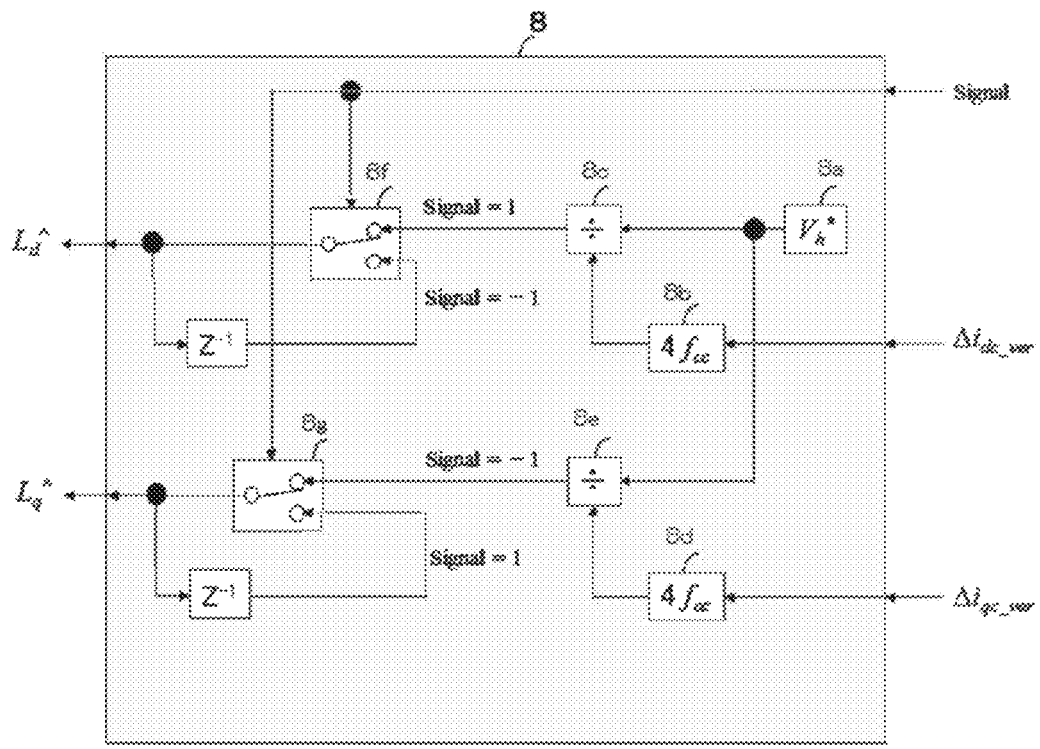
FIG. 5 illustrates a configuration of an inductance estimation unit according to the first embodiment.

FIG. 5 illustrates a configuration of the inductance estimation unit 8 according to the first embodiment. This configuration will be described below. The inductance estimation unit 8 receives the switching signal Signal and the harmonic current amplitude values $\Delta i_{dc\_ver}$ and $\Delta i_{qc\_ver}$. The inductance estimation unit 8 is constituted by a constant 8a ($V_h^*$, which is an amplitude value of the dc-axis harmonic voltage $\Delta v_{dc}^*$ and the qc-axis harmonic voltage $\Delta v_{qc}^*$), and $4f_{cc}$8b and $4f_{cc}$8d, which are constants related to the harmonic frequency $f_{cc}$, a dividing unit 8c, a dividing unit 8e, a switching unit 8f, a switching unit 8g, and blocks indicated by $Z^{-1}$ that hold previous values of $L_d^\wedge$ and $L_q^\wedge$ that are switched according to the signal. Then, the inductance estimation unit 8 calculates d-axis and q-axis inductance estimation values $L_d^\wedge$ and $L_q^\wedge$ according to Equations (9) and (10).

[Equation 9]

$$L_d^\wedge = \frac{1}{2} \cdot \frac{V_h^*}{2 \cdot f_{cc}} \cdot \frac{1}{\Delta i_{dc\_ver}} \qquad \text{Equation (9)}$$

[Equation 10]

$$L_q^\wedge = \frac{1}{2} \cdot \frac{V_h^*}{2 \cdot f_{cc}} \cdot \frac{1}{\Delta i_{qc\_ver}} \qquad \text{Equation (10)}$$

The d-axis and q-axis inductance estimation values $L_d^\wedge$ and $L_q^\wedge$ thus calculated can also be reflected in the phase error estimation calculation equation shown in Equations (7) and (8).

Figure 6:
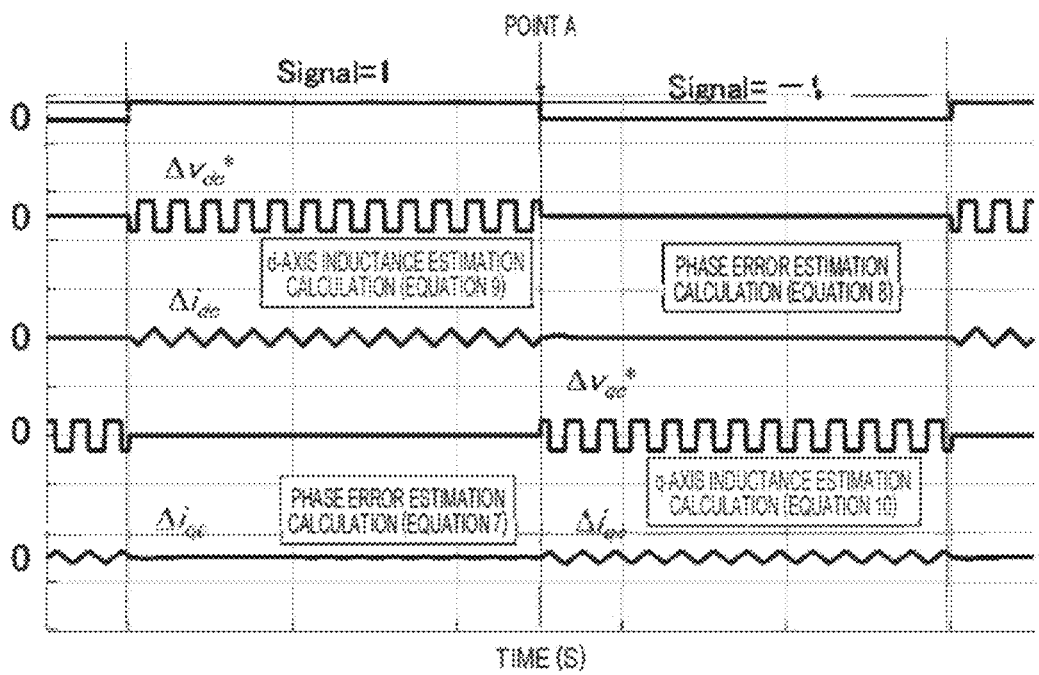
FIG. 6 is a time chart concerning a phase error and inductance.

FIG. 6 illustrates a time chart regarding a phase error and inductance according to the first embodiment. The topmost stage indicates a waveform of the switching signal Signal, the second stage from the top indicates the harmonic voltage $\Delta v_{dc}^*$ superimposed on the dc axis, the third stage from the top indicates the dc-axis harmonic current $\Delta i_{dc}$, and the fourth stage from the top indicates the harmonic voltage $\Delta v_{qc}^*$ superimposed on the qc axis, and the fifth stage from the top indicates the qc axis harmonic current $\Delta i_{qc}$.

When Signal=1, a d-axis inductance estimation value $L_d^\wedge$ can be calculated according to Equation (9), and a phase error $\Delta\theta_{c\_d}$ can be calculated according to Equation (7), and when Signal=−1, a q-axis inductance estimation value $L_q^\wedge$ can be calculated according to Equation (10), and a phase error $\Delta\theta_{c\_q}$ can be calculated according to Equation (8).

As described above, according to the first embodiment, the phase error estimation value $\Delta\theta_c$ and the d-axis inductance and q-axis inductance $L_d$ and $L_q$ can be estimated even during operation of the harmonic superimposition type position sensorless control.

It is also possible to perform position sensorless control by using the phase error estimation value $\Delta\theta_c$ and automatically adjust magnitude of a speed command or a torque command so that the magnet motor 1 does not step out by feeding the inductance estimation values $L_d^\wedge$ and $L_q^\wedge$ back to an upper-level Programmable Logic Controller (PLC).

In the first embodiment, any one of the period of Signal=1 and the period of Signal=−1 may be longer than the other although these periods look identical to each other in FIG. 6. In other words, the periods for which the switching signal Signal that switches harmonics to estimate dc-axis inductance and qc-axis inductance and phase error is 1 and −1 may differ between the dc and qc axes.

Although the harmonic voltage is switched at a point A in FIG. 6, there may be a period for which the harmonic voltages $\Delta v_{dc}^*$ and $\Delta v_{qc}^*$ overlap unless a calculation timing of the phase error and inductance is affected.

Although inductance is estimated during operation in the present embodiment, a table creation unit may create a table concerning a current value and inductance by using a result measured during operation, and inductance may be calculated by using the created table from a next operation timing. This can reduce a calculation cost for calculation of inductance.

Although FIG. 6 illustrates an example in which the harmonic voltage is a square wave, the harmonic voltage may be a sine wave.

Figure 7:
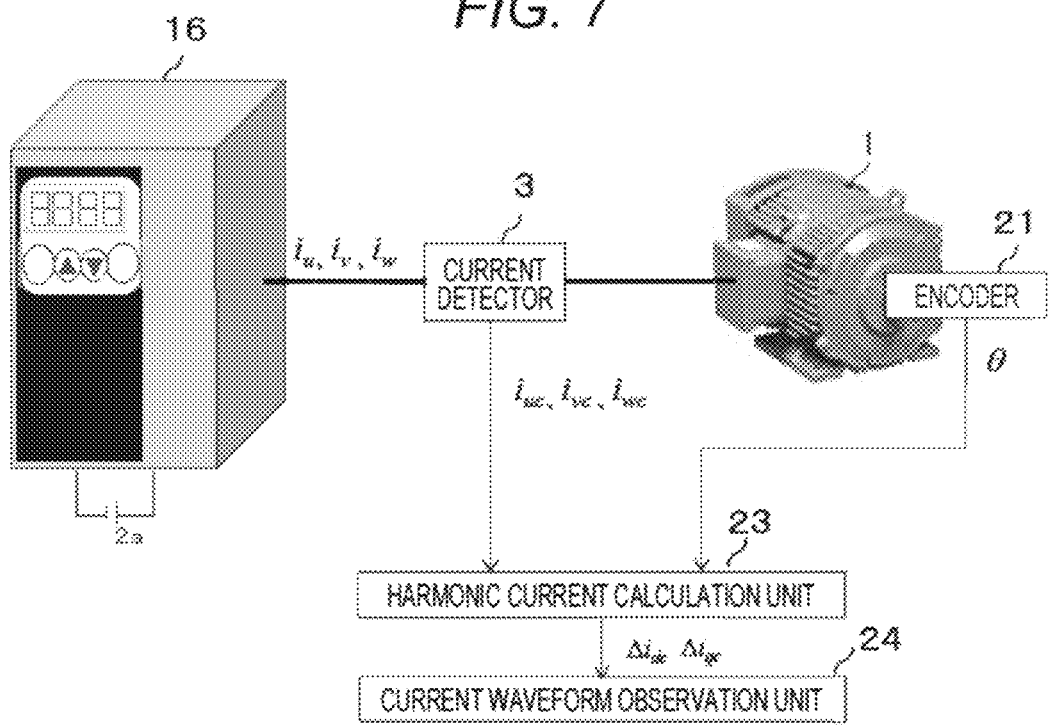
FIG. 7 is a view for explaining a verification method in a case where the first embodiment is used.

The following describes a verification method in a case where the present embodiment is adopted with reference to FIG. 7. A current detector 3 is attached to a power conversion device 16 that drives the magnet motor 1, and an encoder 21 is attached to a shaft of the magnet motor 1.

Figure 8:
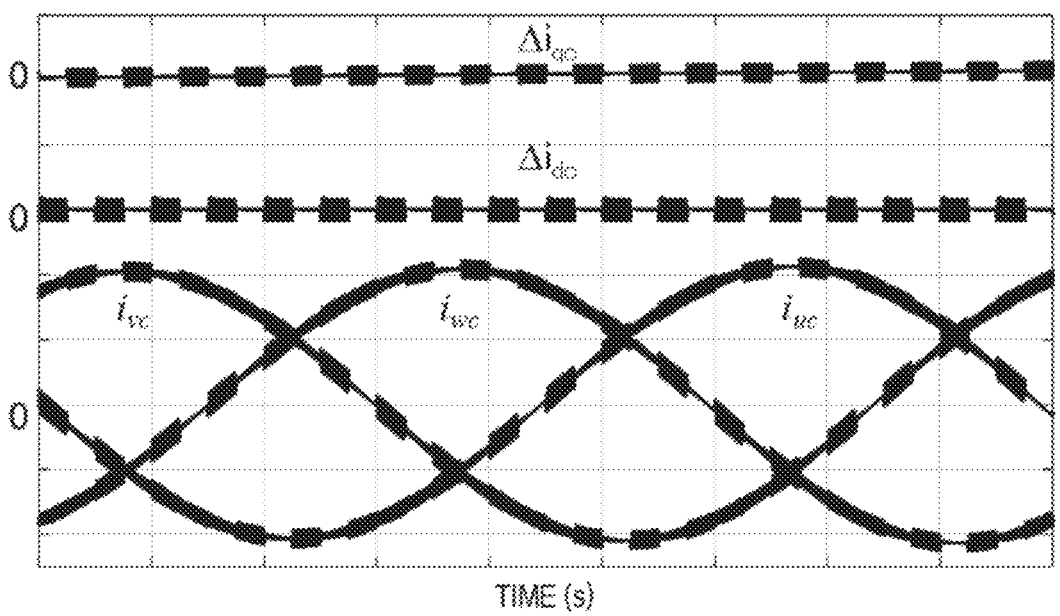
FIG. 8 illustrates a current waveform in a case where the first embodiment is used.

A harmonic current calculation unit 23 receives three-phase AC current detection values ($i_{uc}$, $i_{vc}$, and $i_{wc}$), which are output of the current detector 3, and a position θ, which is output of the encoder, and outputs harmonic currents $\Delta i_{dc}$ and $\Delta i_{qc}$ by performing calculation similar to the current detection calculation unit 5. If $\Delta i_{dc}$ and $\Delta i_{qc}$ are generated alternately in a current waveform observation unit 24, it is clear that the present embodiment is adopted. In a case where the encoder cannot be attached, it is clear that the present embodiment is adopted if waveforms like the ones illustrated in FIG. 8 are obtained by observation of three-phase AC current detection values ($i_{uc}$, $i_{vc}$, and $i_{wc}$).

According to the first embodiment, a phase error, which is a phase difference between a control axis and a magnetic flux axis, and d-axis inductance and q-axis inductance of the magnet motor can be estimated in harmonic superposition type position sensorless control.

Further, according to the first embodiment, it is possible to provide a power conversion device for position sensorless control that accurately estimates inductance during operation in a speed range including a low speed range. The low speed range is a speed range from a halting state to about 10% of a base speed of a motor.

Since d-axis inductance and q-axis inductance during operation can be estimated accurately, an accurate salient pole ratio can be obtained, and stable position sensorless control can be performed even in a case where torque is high by performing the position sensorless control based on the salient pole ratio. The position sensorless is control that does not require an encoder to be attached to a motor.

Second Embodiment

Figure 9:
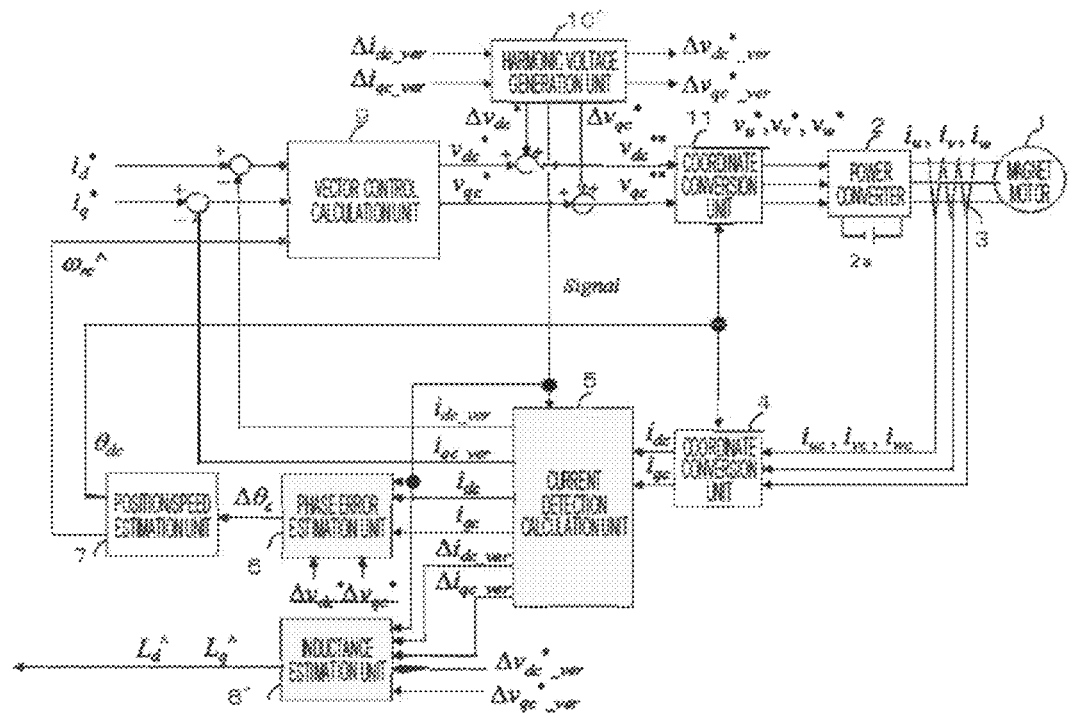
FIG. 9 is a configuration diagram of a system including a power conversion device and a magnet motor according to the second embodiment.

FIG. 9 is a configuration diagram of a system including a power conversion device and a magnet motor according to the second embodiment. Although a predetermined harmonic voltage amplitude value is given in the first embodiment, harmonic current control is added, and inductance estimation values $L_d^\wedge$ and $L_q^\wedge$ are calculated from the amplitude value and a harmonic current amplitude value in the present embodiment. In FIG. 9, a magnet motor 1, a power converter 2, a coordinate conversion unit 4, a current detection calculation unit 5, a phase error estimation unit 6, a position/speed estimation unit 7, a vector control calculation unit 9, a coordinate conversion unit 11, and a DC voltage source 2a are identical to those in FIG. 1.

Figure 10:
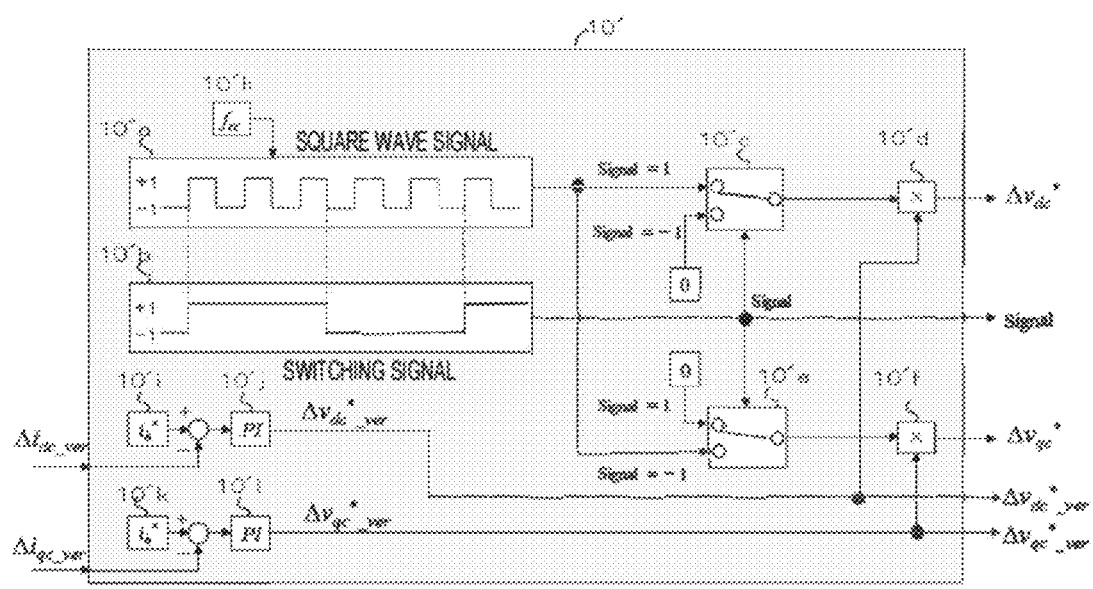
FIG. 10 illustrates a configuration of a harmonic voltage generation unit according to the second embodiment.

FIG. 10 illustrates a harmonic voltage generation unit 10' according to the second embodiment. In FIGS. 10, 10'a to 10'f and 10'h are the same as the square wave signal 10a to the multiplication unit 10f and the setting unit 10h for setting the harmonic frequency $f_{cc}$ in FIG. 2. 10'i and 10'k are harmonic current commands $i_h^*$, and 10'j and 10'l are PI (Proportional+Integral) control units.

On the dc axis, the PI control unit 10'j calculates a dc-axis harmonic voltage amplitude value $\Delta v_{dc}^* {}_{\_ver}$ so that a dc-axis harmonic current amplitude value $\Delta i_{dc\_ver}$ follows the harmonic current command $i_h^*$ and supplies the dc-axis harmonic voltage amplitude value $\Delta v_{dc}^* {}_{\_ver}$ to the multiplication unit 10'd.

On the qc axis, the PI control unit 10'1 calculates a qc-axis harmonic voltage amplitude value $\Delta v_{qc}{}^*{}_{-ver}$ so that a qc-axis harmonic current amplitude value $\Delta i_{qc\_ver}$ follows the harmonic current command $i_h{}^*$ and supplies the qc-axis harmonic voltage amplitude value $\Delta v_{qc}{}^*{}_{-ver}$ to the multiplication unit 10'f. As a result, the dc-axis and qc-axis harmonic voltages $\Delta v_{dc}{}^*$ and $\Delta v_{qc}{}^*$ that have been automatically adjusted are output from the multiplication unit 10'd and the multiplication unit 10'f.

Figure 11:
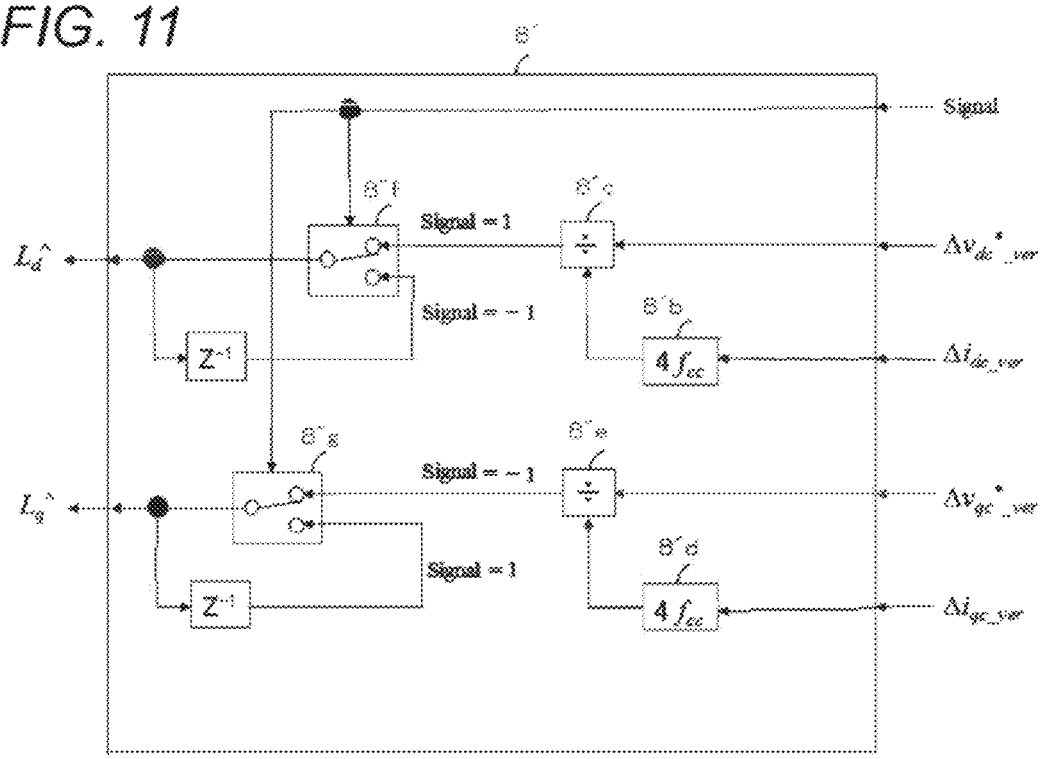
FIG. 11 illustrates a configuration of an inductance estimation unit according to the second embodiment.

FIG. 11 illustrates a configuration of the inductance estimation unit 8' according to the second embodiment. This configuration will be described below. In FIG. 11, 8'b, 8'd, 8'f, 8'g, and $Z^{-1}$ are the same as constants $4f_{cc}8b$ and $4f_{cc}8d$ related to the harmonic frequency $f_{cc}$, the switching unit 8f, the switching unit 8g, and $Z^{-1}$ in FIG. 5. The dc-axis harmonic voltage amplitude value $\Delta v_{dc}{}^*{}_{-ver}$ input from the harmonic voltage generation unit 10' and the qc-axis harmonic voltage amplitude values $\Delta v_{qc^*\_ver}$ input from the harmonic voltage generation unit 10' are input to 8'c and 8'e, respectively, and d-axis and q-axis inductance estimation values $L_d{}^*$ and $L_q{}^*$ are calculated according to Equations (11) and (12), respectively.

[Equation 11]

$$\hat{L_d} = \frac{1}{2} \cdot \frac{\Delta v^*_{dc\_ver}}{2 \cdot f_{cc}} \cdot \frac{1}{\Delta i_{dc\_ver}} \quad \text{Equation (11)}$$

[Equation 12]

$$\hat{L_d} = \frac{1}{2} \cdot \frac{\Delta v^*_{qc\_ver}}{2 \cdot f_{cc}} \cdot \frac{1}{\Delta i_{qc\_ver}} \quad \text{Equation (12)}$$

The d-axis and q-axis inductance estimation values $L_d{}^*$ and $L_q{}^*$ thus calculated can also be reflected in the phase error estimation calculation equations shown in Equations (7) and (8).

With such a configuration, a harmonic current amplitude value can be controlled to be constant. It is therefore possible to provide a highly efficient power conversion device in which no extra current is generated.

Third Embodiment

Figure 12:
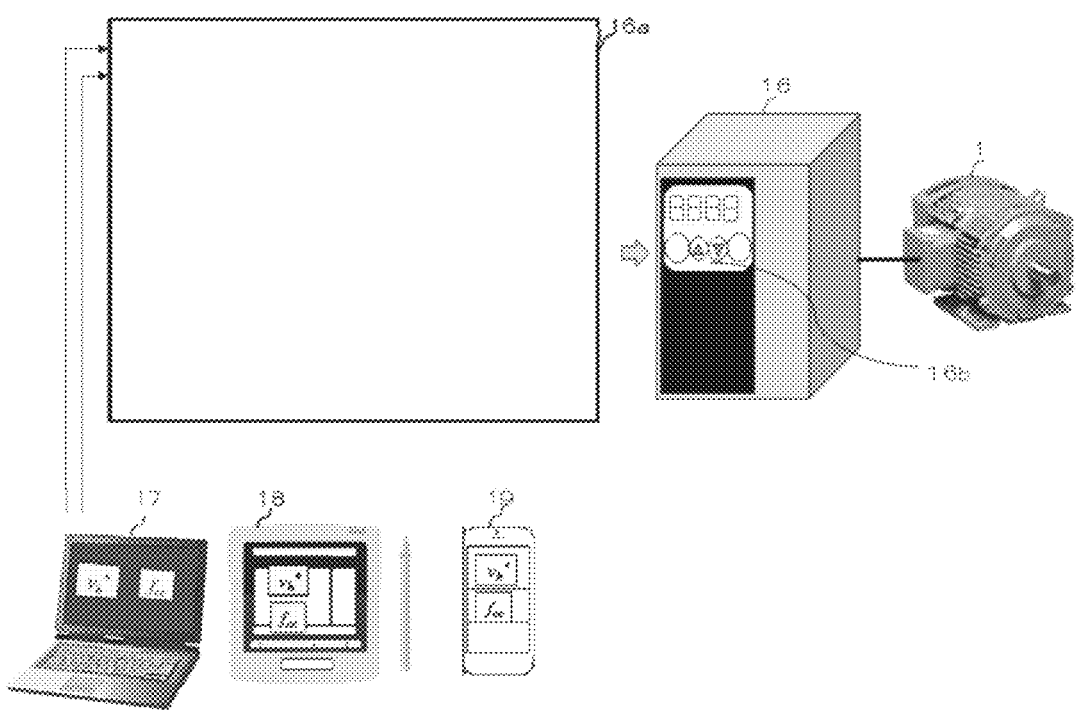
FIG. 12 is a configuration diagram of a system including a power conversion device and a magnet motor according to the third embodiment.

FIG. 12 is a configuration diagram of a system including a power converter and a magnet motor according to the third embodiment. The present embodiment is applied to a magnet motor drive system.

A magnet motor 1, which is a component of FIG. 1, is driven by a power conversion device 16. The power conversion device 16 has software 16a and hardware. The coordinate conversion unit 4, the current detection calculation unit 5, the phase error estimation unit 6, the position/speed estimation unit 7, the inductance estimation unit 8, the vector control calculation unit 9, the harmonic voltage generation unit 10, and the coordinate conversion unit 11 in FIG. 1 are provided as the software 16a. The power converter 2, the DC voltage source 2a, and the current detector 3 in FIG. 1 are provided as hardware.

Processing of the software 16a is executed by a microcomputer or a processor. External devices or external higher-order devices are prepared, examples of which include a digital operator 16b of the power conversion device 16, a personal computer 17, a tablet 18, and a smartphone 19 that can display functions and stored information for a user and enables the user to give an instruction. On the devices such as the personal computer 17, the tablet 18, and the smartphone 19, a harmonic voltage amplitude value and a harmonic voltage frequency in the software 16a can be set.

If the configuration of the second embodiment is adopted, a harmonic current amplitude value may be used instead of the harmonic voltage amplitude value.

When the present embodiment is applied to a magnet motor drive system, it is possible to estimate a phase error and inductance.

The harmonic voltage amplitude value and the harmonic voltage frequency may be set on a programmable logic controller (PLC), which is a higher-order device, or on a local area network (LAN) connected to a computer.

In the first to third embodiments, the calculation shown in Equation (1) is performed by using current command values $i_d{}^*$ and $i_q{}^*$, current detection values $i_{dc}$ and $i_{qc}$, and electric constants of the magnet motor 1.

Voltage correction values $\Delta v_{dc}$, and $\Delta v_{qc}$ may be created by calculation shown in Equation (13) from the current command values $i_d{}^*$ and $i_q{}^*$ and the current detection values $i_{dc}$ and $i_{qc}$, and calculation for adding the voltage correction values and vector control voltage reference values shown in Equation (14) may be performed according to Equation (15).

[Equation 13]

$$\Delta v_{dc} = \left(K_{pd} + \frac{K_{id}}{s}\right)(i_d^* - i_{dc}) \quad \text{Equation (13)}$$

$$\Delta v_{qc} = \left(K_{pq} + \frac{K_{iq}}{s}\right)(i_q^* - i_{qc})$$

Definitions of the signs in Equation (13) are as follows: $\Delta v_{dc}$: d-axis voltage correction value, $\Delta v_{qc}$: q-axis voltage correction value, $K_{pd}$: d-axis current control proportional gain, $K_{id}$: d-axis current control integrated gain, $K_{pq}$: q-axis current control proportional gain, $K_{iq}$: q-axis current control Integrated gain, s: Laplace operator.

$$v^*_{dc0} R^* i_d^* - \hat{\omega}_{rc} \hat{L}_q^* \frac{1}{1 + Tacrs} i_q^* \quad \text{Equation (14)}$$

$$v^*_{qc0} R^* i_q^* - \hat{\omega}_{rc} \hat{L}_q^* \frac{1}{1 + Tacrs} i_d^* + \hat{\omega}_{rc} K_e^*$$

Definitions of the signs in Equation (14) are as follows: $v_{dco}{}^*$: d-axis voltage reference value, $v_{qco}{}^*$: q-axis voltage reference value, Tacr: time constant equivalent to current control response frequency, s: Laplace operator, $K_e$: induced voltage coefficient.

[Equation 15]

$$v^*_{dc} = v^*_{dc0} + \Delta v_{dc} \quad \text{Equation (15)}$$

$$v^*_{qc} = v^*_{qc0} + \Delta v_{qc}$$

Intermediate current command values $i_d{}^{}$ and $i_q{}^{}$ shown in Equation (16) used for the vector control calculation may be created from the current commands $i_d{}^*$ and $i_q{}^*$ and the current detection values $i_{dc}$ and $i_{qc}$, and calculation shown in Equation (17) using the speed estimation value $\omega_{rc}{}^*$ and the electric constants of the magnet motor 1 may be performed.

A vector control method may be employed in which calculation is performed according to Equation (18) using the dc-axis current command $i_d^*$, the qc-axis current detection value $i_{qc}$, the speed command $\omega_r$, and the electric constants of the magnet motor 1.

[Equation 16]

$$i_d^{**} = \left(K_{pd} + \frac{K_{id}}{s}\right)(i_d^* - i_{dc})$$
$$i_q^{**} = \left(K_{pq} + \frac{K_{iq}}{s}\right)(i_q^* - i_{qc})$$

Equation (16)

Definitions of the signs in Equation (16) are as follows: $K_{pd}$: d-axis current control proportional gain, $K_{id}$: d-axis current control integrated gain, $K_{pq}$: q-axis current control proportional gain, $K_{iq}$: q-axis current control integrated gain, s: Laplace operator.

[Equation 17]

$$v_{dc}^* R^* i_d^{**} - \hat{\omega}_{rc} L_q^* \frac{1}{1 + L_q^*/R^* \cdot s} i_q^{**}$$
$$v_{qc}^* R^* i_q^{**} - \hat{\omega}_{rc} L_d^* \frac{1}{1 + L_d^*/R^* \cdot s} i_d^{**} + \hat{\omega}_{rc} K_e^*$$

Equation (17)

[Equation 18]

$$v_{dc}^* = R^* i_d^* - \omega_r^* L_q^* \frac{1}{1 + T_d s} i_{qc}$$
$$v_{qc}^* = R_1^* + \omega_r^{**}(L_d^* i_d^* + K_e^*)$$

Equation (18)

Definitions of the signs in Equation (18) are as follows: $R_1$: primary resistance of magnet motor, $T_d$: delay time constant of q-axis current command $i_q^*$.

In the first to third embodiments, the switching element that constitutes the power converter 2 may be a Si (silicon) semiconductor element or may be a wide bandgap semiconductor element such as SiC (silicon carbide) and GaN (gallium nitride).

REFERENCE SIGNS LIST 2 power converter
3 current detector
4 coordinate conversion unit
5 current detection calculation unit
6 phase error estimation unit
7 position/speed estimation unit
8, 8' inductance estimation unit
9 vector control calculation unit
10, 10' harmonic voltage generation unit
16 power conversion device
$\hat{L_d}$ d-axis inductance estimation value
$\hat{L_q}$ q-axis inductance estimation value
Signal switching signal

The invention claimed is:

1. A power conversion device comprising:
a harmonic voltage generation unit that superimposes harmonic voltages of a dc-axis and qc-axis on voltage commands of the dc-axis and qc-axis in accordance with a switching signal; and
an inductance estimation unit that estimates pieces of inductance of the dc-axis and qc-axis on a basis of harmonic currents of the dc-axis and qc-axis, amplitude values of the harmonic voltages, and the switching signal.

2. The power conversion device according to claim 1, wherein
the switching signal has a cycle that is an integral multiple of a square wave signal.

3. The power conversion device according to claim 1, further comprising a phase error estimation unit that estimates a phase error on a basis of the switching signal, current detection values of the dc-axis and qc-axis, and the harmonic voltages of the dc-axis and qc-axis.

4. The power conversion device according to claim 1, wherein
the harmonic is a square wave or a sine wave.

5. The power conversion device according to claim 1, wherein
a period of the switching signal varies between the dc-axis and the qc-axis.

6. The power conversion device according to claim 1, wherein
the inductance estimation unit calculates an inductance estimation value of the dc-axis on a basis of a constant representing the amplitude value of the dc-axis harmonic voltage, an amplitude value of the dc-axis harmonic current, and a value related to a harmonic frequency and calculates an inductance estimation value of the qc-axis on a basis of a constant representing the amplitude value of the qc-axis harmonic voltage, an amplitude value of the qc-axis harmonic current, and a value related to a harmonic frequency.

7. The power conversion device according to claim 1, wherein
the harmonic voltage generation unit calculates the amplitude values of the dc-axis and qc-axis harmonic voltages on a basis of command values of the harmonic currents and harmonic current values of the dc-axis and qc-axis.

8. The power conversion device according to claim 7, wherein
the inductance estimation unit calculates an inductance estimation value of the dc-axis on a basis of the amplitude value of the dc-axis harmonic voltage supplied from the harmonic voltage generation unit, an amplitude value of the dc-axis harmonic current, and a value related to a harmonic frequency and calculates an inductance estimation value of the qc-axis on a basis of the amplitude value of the qc-axis harmonic voltage supplied from the harmonic voltage generation unit, an amplitude value of the qc-axis harmonic current, and the value related to the harmonic frequency.

9. The power conversion device according to claim 1, wherein
the harmonic voltage generation unit sets a harmonic frequency, the amplitude values, or commands of the harmonic currents from an outside.

10. The power conversion device according to claim 9, wherein
the outside is a personal computer, a tablet, or a smartphone, which is an external device, a programmable logic controller, which is a higher-order device, or a local area network connected to a computer.

11. The power conversion device according to claim 1, further comprising a table creation unit that creates a table concerning the dc-axis and qc-axis harmonic currents and the pieces of estimated inductance.

12. The power conversion device according to claim 1, further comprising a power converter that outputs an AC voltage,
wherein
the power converter is connected to a magnetic motor, and
the power converter outputs the voltage to the magnetic motor so that an output voltage or a rotational speed of the magnetic motor is made variable.

13. The power conversion device according to claim 1, wherein
the dc-axis inductance and qc-axis inductance estimated by the inductance estimation unit are fed back to a higher-order control device.

14. The power conversion device according to claim 3, further comprising:
a phase/speed estimation unit that outputs a speed estimation value and a position estimation value on a basis of the phase error estimated by the phase error estimation unit;
a vector control calculation unit that outputs the dc-axis and qc-axis voltage commands on a basis of the speed estimation value;
a current detector that detects a current of a motor; and
a coordinate conversion unit that outputs current detection values of the dc-axis and qc axis from the current detected by the current detector on a basis of the position estimation value.

15. The power conversion device according to claim 14, further comprising a current detection calculation unit that outputs amplitude values of the harmonic currents on a basis of the dc-axis and qc-axis current detection values and an average of the current detection values.

* * * * *